US012606109B2

(12) United States Patent
Esfandiari et al.

(10) Patent No.: US 12,606,109 B2
(45) Date of Patent: Apr. 21, 2026

(54) MOOD IMPROVEMENT SYSTEM

(71) Applicant: GM Global Technology Operations LLC, Detroit, MI (US)

(72) Inventors: Masoumeh Esfandiari, Richmond Hill (CA); Russell A. Patenaude, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 279 days.

(21) Appl. No.: 18/491,688

(22) Filed: Oct. 20, 2023

(65) Prior Publication Data

US 2025/0128671 A1      Apr. 24, 2025

(51) Int. Cl.
*B60R 16/037*          (2006.01)

(52) U.S. Cl.
CPC .................................. *B60R 16/037* (2013.01)

(58) Field of Classification Search
CPC ..... B60R 16/037; B60W 40/08; B60W 50/08; B60W 2540/22
See application file for complete search history.

(56) References Cited

U.S. PATENT DOCUMENTS

| | | | | |
|---|---|---|---|---|
| 10,332,495 B1 * | 6/2019 | Mortensen | ........... | G10H 1/0008 |
| 10,482,333 B1 * | 11/2019 | el Kaliouby | ........... | G16H 20/70 |
| 11,148,591 B2 * | 10/2021 | Brown | ............... | H05B 47/1965 |
| 2009/0024276 A1 * | 1/2009 | Mercurio | ................. | B60Q 9/00 |
| | | | | 381/86 |

| | | | | |
|---|---|---|---|---|
| 2013/0144470 A1 * | 6/2013 | Ricci | .................... | G08G 1/0112 |
| | | | | 701/2 |
| 2014/0207338 A1 * | 7/2014 | Healey | ................... | B60K 35/65 |
| | | | | 701/1 |
| 2016/0288796 A1 * | 10/2016 | Yuan | ...................... | B60W 40/08 |
| 2017/0185362 A1 * | 6/2017 | Cansino | ................. | B60K 35/10 |
| 2017/0200449 A1 * | 7/2017 | Penilla | .................... | G10L 25/63 |
| 2018/0061415 A1 * | 3/2018 | Penilla | .................... | G10L 15/02 |
| 2018/0118218 A1 * | 5/2018 | Miloser | ................... | B60W 50/14 |
| 2019/0160195 A1 * | 5/2019 | Kelsen | .................... | A61L 9/125 |
| 2020/0290628 A1 * | 9/2020 | Pinoteau | ............... | B60W 40/04 |
| 2020/0310528 A1 * | 10/2020 | Upmanue | ............ | A61B 5/4803 |
| 2021/0261050 A1 * | 8/2021 | Sobhany | ................. | B60Q 3/80 |
| 2021/0394766 A1 * | 12/2021 | Crawford | ............ | B60W 50/087 |
| 2022/0135052 A1 * | 5/2022 | Patel | .................... | G06V 20/588 |
| | | | | 340/439 |
| 2022/0159432 A1 * | 5/2022 | Crawford | ................ | H04W 4/48 |
| 2025/0029488 A1 * | 1/2025 | Zahid | .................. | H04W 64/003 |
| 2025/0065890 A1 * | 2/2025 | Theisinger | ........ | B60W 50/0098 |

* cited by examiner

*Primary Examiner* — Mussa A Shaawat
(74) *Attorney, Agent, or Firm* — Honigman LLP; Matthew H. Szalach; Jonathan P. O'Brien

(57)          ABSTRACT

A mood improvement system for a vehicle includes a vehicle processor storing data including vehicle location, vehicle event data, and current driver mood information. The mood improvement system also includes a server communicatively coupled to the vehicle processor and configured to determine whether a mood intervention should be activated. The determination of whether a mood intervention should be activated is based on a driver mood profile including the current driver mood information, and one or more of contextual vehicle information including vehicle event data and vehicle location, and crowdsourced data including current driver mood information from nearby vehicles.

17 Claims, 3 Drawing Sheets

200 Vehicle Processor

202 Vehicle Data

204 Vehicle Location

206 Vehicle Event Data

208 Current Driver Mood Information

Server 300

100

10

| 200 Vehicle Processor |
| 202 Vehicle Data |
| 204 Vehicle Location |
| 206 Vehicle Event Data |
| 208 Current Driver Mood Information |

Server
300

MOOD IMPROVEMENT SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a mood improvement system for a vehicle.

With increasingly longer commutes and traffic congestion, people are spending more and more time in their vehicles. As such, it is important to make driving and riding in a vehicle as pleasant of an experience as possible.

Conventional vehicles include heating, ventilation, and air conditioning (HVAC) systems that can be used to control the temperature and humidity within a cabin of a vehicle. Such vehicles also typically include entertainment systems such as radios and video screens that allow vehicle occupants to listen to music, podcasts, and other media and, in the case of a vehicle passenger, to watch a show or movie. These systems help increase the enjoyment of a vehicle occupant while traveling in the vehicle. Finally, conventional vehicles also include a multitude of control systems that allow vehicle occupants to adjust and control vehicle features such as windows, sunroofs, cabin lighting, and the like.

While a vehicle occupant is free to control HVAC systems, entertainment systems, and vehicle control systems to increase the enjoyment of the vehicle occupant while traveling in a vehicle, the foregoing systems are not controlled in relation to a mood of the vehicle occupant. Accordingly, the systems are not optimized to improve the mood of the vehicle occupant while traveling in the vehicle.

SUMMARY

In some examples, a mood improvement system for a vehicle includes a vehicle processor storing data including vehicle location, vehicle event data, and current driver mood information. The mood improvement system also includes a server communicatively coupled to the vehicle processor and configured to determine whether a mood intervention should be activated. The determination of whether a mood intervention should be activated is based on a driver mood profile including the current driver mood information, and one or more of contextual vehicle information including vehicle event data and vehicle location, and crowdsourced data including current driver mood information from nearby vehicles. In some examples, the current driver mood information is based on a user input. In some examples, the determination of whether a mood intervention should be activated is also based on crowdsourced data including current driver mood information from nearby vehicles. Additionally, the vehicle location may include one or more of route data, traffic conditions, and weather conditions. In some examples, the vehicle event data includes one or more of window position, seat position, vehicle temperature, vehicle lighting, or automated driver assistance status. Additionally, the server may be configured to implement the mood intervention if it is determined that the mood intervention should be activated. In some examples, the determination of whether a mood intervention should be activated is determined using a dynamic threshold determined by the server. A vehicle may incorporate the mood improvement system.

In some examples, a mood improvement system for a vehicle includes a vehicle processor storing data including vehicle location, vehicle event data, and current driver mood information. The mood improvement system also includes a server communicatively coupled to the vehicle processor and configured to determine whether a mood intervention should be activated. The determination of whether a mood intervention should be activated is based on a driver mood profile including the current driver mood information and contextual vehicle information including vehicle event data and vehicle location. In some examples, the crowdsourced data includes one or more of current driver mood information from nearby vehicles or vehicle settings including one or more of vehicle seat location, window position, temperature settings, and audio settings from nearby vehicles based on the vehicle location. Additionally, the determination of whether a mood intervention should be activated may be determined using a dynamic threshold determined by the server. In some examples, the current driver mood information is based on a user input. Additionally, the current driver mood information may be based on data from vehicle cameras or vehicle sensors. In some examples, the server is also configured to implement the mood intervention if it is determined that the mood intervention should be activated.

In another configuration, a mood improvement system for a vehicle includes a vehicle processor storing data including vehicle location and vehicle event data. The mood improvement system also includes a server communicatively coupled to the vehicle processor and configured to determine a current driver mood and determine a dynamic threshold based on one or more of contextual vehicle information including the vehicle event data and the vehicle location or crowdsourced data including one or more of current driver mood information from nearby vehicles or crowdsourced vehicle settings including one or more of a vehicle seat location, vehicle audio conditions, a vehicle window position, and a usage of advanced driver assistance systems from nearby vehicles. The server is also configured to display suggested vehicle improvements when the current driver mood is below the dynamic threshold. In some examples, determining a current driver mood includes prompting the vehicle driver to input the current mood of the driver. Additionally, in some examples, the step of determining a current driver mood includes evaluating the vehicle driver using vehicle cameras and vehicle sensors. In some examples, the server is also configured to implement the suggested vehicle improvements. Additionally, in some examples, the server is also configured to determine an updated current driver mood once vehicle improvements have been implemented. In some examples, a vehicle incorporates the mood improvement system.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
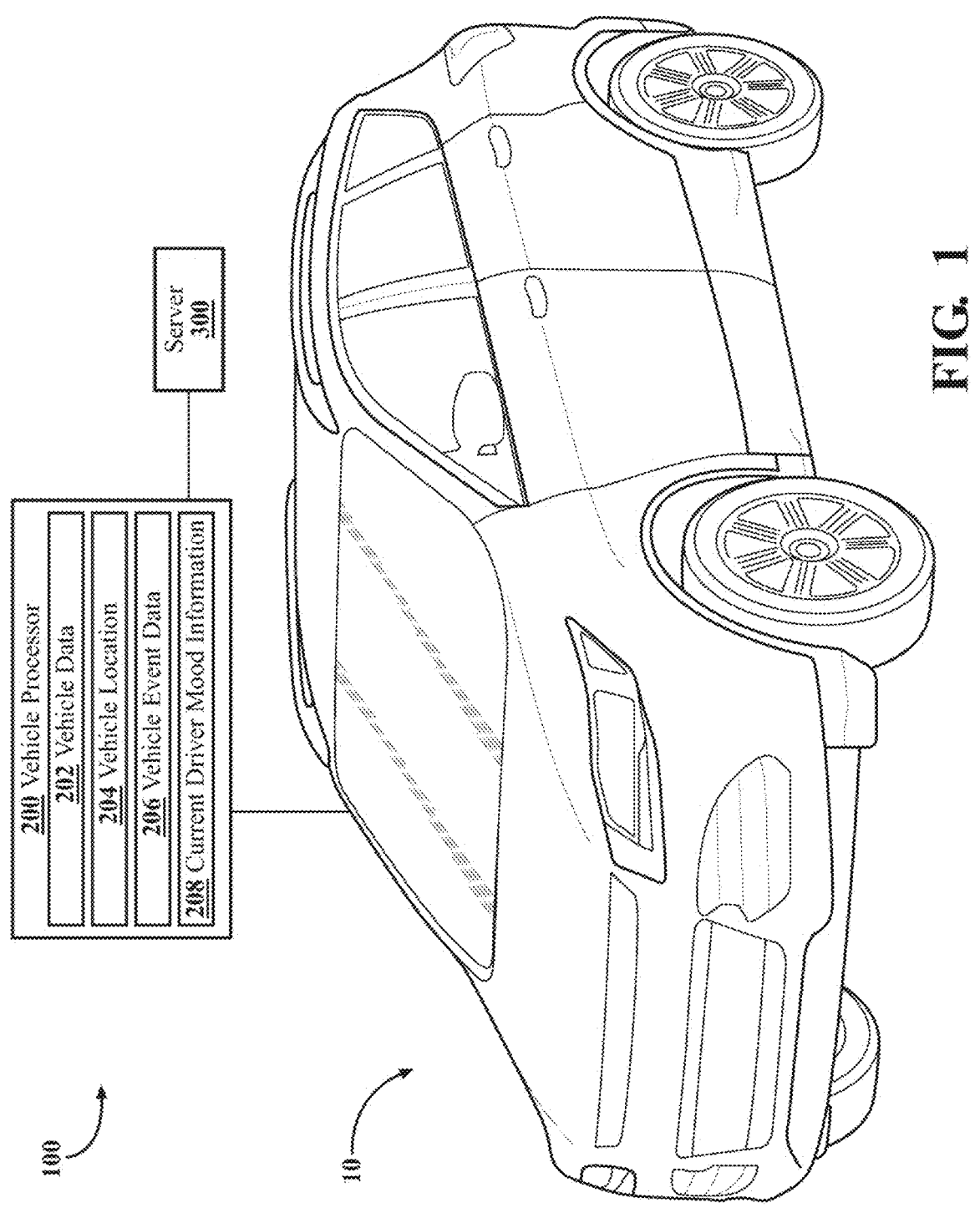
FIG. 1 is a perspective view of a vehicle including a mood improvement system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
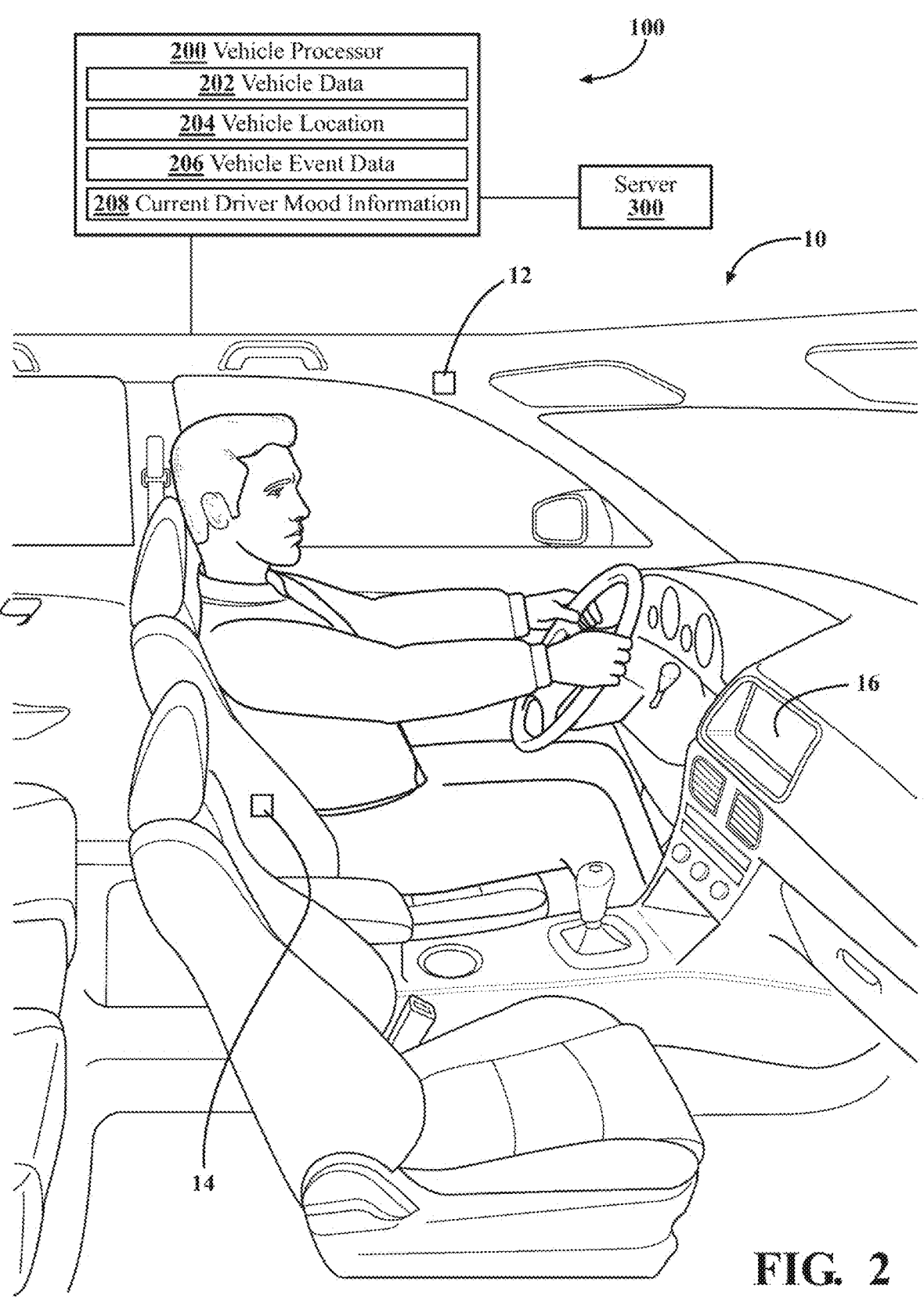
FIG. 2 is an interior view of the vehicle of FIG. 1 including the mood improvement system according to the present disclosure.
Figure 3:
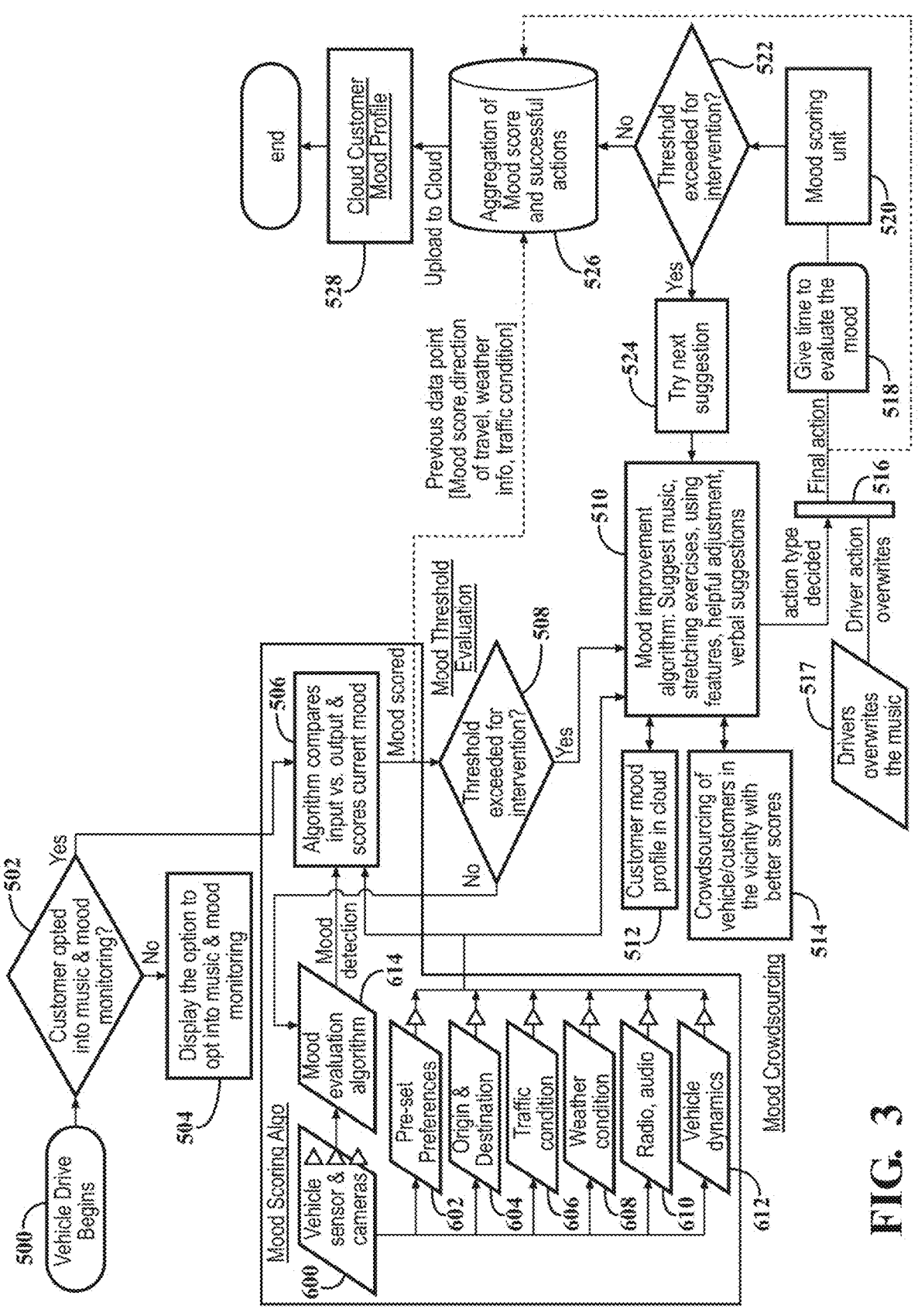
FIG. 3 is an example flow diagram of a mood improvement system according to the present disclosure.

Referring now to FIGS. 1-3, a mood improvement system 100 for a vehicle 10 is illustrated in FIG. 1. The mood improvement system includes a vehicle processor 200 and a server 300, described in more detail below, communicatively coupled with the vehicle processor 200. The vehicle 10 is contemplated to be an electric vehicle 10 (EV) and may include autonomous or semi-autonomous capabilities. Additionally or alternatively, the vehicle 10 may be a hybrid vehicle 10 incorporating both EV and internal combustion engine (ICE) components and capabilities. Additionally, the vehicle 10 may include only an internal combustion engine or other power source, if desired.

A vehicle interior is illustrated in FIG. 2 having a vehicle driver seated therein. The vehicle interior may be equipped with a plurality of vehicle cameras 12 and/or vehicle sensors 14 configured to gather data related to the vehicle driver. Additionally, the vehicle interior may include a dashboard 16 configured to display words or images to the vehicle driver. Moreover, the dashboard 16 may also be configured for allowing for a user input or other action by the vehicle driver.

Referring again to the example illustrated in FIGS. 1-3, the vehicle processor 200 stores vehicle data 202 of the vehicle 10. While element 200 is described and shown as being a processor, element 200 may include processing hardware and memory hardware. The memory hardware allows element 200 to store data and instructions for instructing the processing hardware to perform the operations shown in FIG. 3, for example.

In some examples, the vehicle data 202 includes vehicle location 204, vehicle event data 206, and current driver mood information 208. The vehicle location 204 generally pertains to a location of the vehicle 10. The vehicle location 204 may be gathered from a Global Positioning System (GPS) or other navigation system. Additionally or alternatively, the vehicle location 204 may be gathered from a third-party application or a user device such as a cellular phone or tablet. Once the vehicle location 204 is known, the location may be communicated to the vehicle processor 200. Moreover, the vehicle location 204 may include route data such that a route the vehicle 10 is traveling along—including origin and destination information—may be communicated to the vehicle processor 200. In some examples, the vehicle location 204 may also include traffic data including, but not limited to, data related to current and upcoming traffic conditions along the route. Additionally, in some examples, the vehicle location 204 may include weather data for the current or upcoming locations along the route. The vehicle processor 200 may be configured to sense, measure, or otherwise gather weather conditions including, but not limited to, the past, current, and future temperature, past, current, and future rain conditions, past, current, and future current air quality conditions, and/or past, current, and future humidity conditions.

The vehicle event data 206 generally pertains to actions the vehicle 10 takes during operation and/or current vehicle settings. In some examples, the vehicle event data 206 may be gathered by one or more vehicle sensors 14 and/or vehicle cameras 12 and may be communicated to the vehicle processor 200 for storage and/or further processing. The vehicle event data 206 may include vehicle dynamics such as vehicle speed, vehicle lane merge, vehicle steering wheel angle, vehicle crosswalk data, or other vehicle operations. In some examples, the vehicle speed may pertain to the current speed of the vehicle 10, whether the vehicle 10 has stopped, whether the vehicle 10 has quickly changed speed, and other vehicle speed-related events. The vehicle lane merge may pertain to whether a lane change by the vehicle 10 has been detected and/or whether a lane has ended based on visual evidence from the vehicle camera 12. The vehicle steering wheel angle may be indicative of the current angle of the steering wheel and whether the angle of the sterling wheel has quickly changed, thereby indicating a vehicle turn. The vehicle crosswalk data includes whether the vehicle camera has detected one or more pedestrian crosswalks. Detection of a crosswalk and, more specifically, detection of a number of crosswalks in a given stretch of road, may require frequents stopping of the vehicle 10 due to pedestrians and/or stop signs associated with the crosswalks.

The vehicle event data 206 may also include vehicle settings. The vehicle settings for a particular vehicle driver may include stored preferences of vehicle settings or may be gathered by the vehicle sensors 14 and/or the vehicle cameras 12. The vehicle settings may be any customizable setting in the vehicle including, but not limited to, window position, seat position, audio settings, vehicle lighting, cruise control or other automated driver assistance status, vehicle temperature settings, and/or vehicle wiper settings. For example, the current vehicle settings may include the volume of the music playing in the vehicle 10. The current vehicle settings may also include information regarding a current temperature of the interior of the vehicle 10 and a desired temperature of the interior of the vehicle 10.

Referring still to the example shown in FIGS. 1-3, the current driver mood information 208 generally pertains to any information pertaining to the driver's current mood. In some examples, current driver mood information 208 may include driver inputted information. To facilitate this, the vehicle processor 200 and/or the server 300 is configured to ask the driver to input their current mood. Additionally, in some examples, this may be an audio and/or visual prompt displayed on the dashboard 16. The driver may respond through audio inputs, inputs on a dashboard 16, visual inputs, or other inputs. The inputted driver mood information may be a numerical value, a named mood category, and/or a visual mood category.

Additionally, the current driver mood information 208 may include information gathered from the vehicle cameras 12 and/or the vehicle sensors 14. For example, the current driver mood information 208 may include audio information such as a volume of voices in the vehicle 10 and/or visual information such as facial expressions of one or more vehicle occupants. In some examples, the current driver mood information 208 may include other measured or sensed information including the vehicle driver's force on the steering wheel and/or body position in relation to a vehicle seat.

With further reference to FIGS. 1-3, the server 300 is configured as a network and/or a cloud-based system that communicates with the vehicle processor 200. It is also contemplated that the vehicle processor 200 may communicate any or all of the vehicle data 202 to the server 300 for further processing and/or evaluation. The vehicle processor 200 and/or the server 300 may continuously and/or regularly update such that the vehicle data 202 is updated in real-time.

The server 300 is also configured to communicate with third-party processors to collect third-party data. For example, the third-party processors may include, but are not limited to, other vehicle processors 200 along the route. Additionally or alternatively, the third-party processors may include third-party user devices within vehicles 10 along the route such as cellular phones and tablets. In some examples, additional vehicle data 202 is gathered by the server 300 through third-party processors as crowdsourced information such that one or more of the vehicle location, the vehicle event data, and the vehicle mood data is gathered from nearby vehicles 10, or other vehicles 10 along the route.

Crowdsourced information from nearby vehicles 10 may be gathered through Bluetooth™, Wi-Fi™, third-party applications, or other similar methods. The vehicle location 204 may be crowdsourced from other vehicles 10 including, but not limited to, route information, traffic, and/or current weather conditions of other vehicles along the route. Additionally, in some examples, the current driver mood information 208 may be crowdsourced from other vehicles 10 including, but not limited to, inputted driver mood information and gathered driver mood information of other vehicles along the route. Additionally, the vehicle event data 206 may be crowdsourced from other vehicles 10 including, but not limited to, vehicle speed, vehicle lane merge, vehicle steering wheel angle, vehicle crosswalk data, or vehicle settings of other vehicles along the route.

In some examples, the server 300 may also be configured to access additional information from third-party servers such as future and past weather information, time, day of the week, and date information. In some examples, the server 300 is configured to use this information as additional vehicle data 202 to help confirm or provide additional context to the driver mood information.

The server 300 may also be configured to create and update a driver mood profile. The driver mood profile may include current and previous vehicle driver mood scores, vehicle data 202 including current and previous vehicle settings, and information related to previous mood interventions and their effect on the vehicle driver's mood.

Referring still to the example illustrated in FIGS. 1-3, the server 300 is configured to determine a current mood of the vehicle driver. In some examples, determining the current mood of the vehicle driver includes prompting the vehicle driver to input their current mood. As described above, this may be an audio and/or visual prompt displayed on the dashboard 16. In some examples, the driver may respond through audio inputs, inputs on the dashboard 16, visual inputs, or other inputs. Alternatively, or in conjunction with the vehicle driver input, the server 300 may be configured to use the current driver mood information 208 to determine the current mood of the vehicle driver. For example, the server 300 may use data gathered from the vehicle cameras 12 and or the vehicle sensors 14, which may provide information related to the current mood of the driver. More specifically, the server 300 may use facial expression recognition software to determine the current mood of the driver based on facial cues.

Additionally, the server 300 is configured to determine whether a mood intervention should be activated. The determination of whether a mood intervention should be activated may be based on one or more of the current driver mood information 208, contextual vehicle information, and crowdsourced data from nearby vehicles. In some examples, whether a mood intervention should be activated is determined using a dynamic threshold determined by the server 300. Contextual information and/or crowdsourced data may be weighted differently in calculating the dynamic threshold then other information such as the current driver mood information 208. For example, points may be added or subtracted to the dynamic threshold for various situations, i.e. going to work, going home from work, going to a funeral home, etc. Additionally, the dynamic threshold is an aggregation of an original dynamic threshold combined with
previous successful actions taken. For example, if the server
300 determines that the vehicle 10 just left a hospital based
on the vehicle location 204 and route information, the
dynamic threshold may be increased such that it would be
unlikely for the server 300 to suggest mood improvements
as the server 300 has determined that it is very unlikely any
suggestions would have an effect on the driver's mood.
Additionally, in some examples, if the server 300 has
determined that the weather is unseasonably warm based on
current and past weather information and date information,
the dynamic threshold may decrease such that it would be
likely for the server 300 to suggest mood improvements (i.e.,
opening the sunroof or other windows) that may have an
effect on the driver's mood. Moreover, if the server 300 has
determined that other vehicles nearby have a similar or
lower current driver mood score, the dynamic threshold may
increase such that it would be unlikely that any suggestions
would have an effect on the driver's mood. Additionally, if
the server 300 has determined that other vehicle drivers with
their windows open have a higher current driver mood score
than the instant vehicle driver, the dynamic threshold may
decrease such that it would be likely that suggesting similar
vehicle settings (i.e., opening the windows), may have an
effect on the driver's mood. Moreover, if the server 300 has
determined that opening the windows may have an effect on
the driver's mood, but previous attempts by the server 300
to suggest opening the windows have been overridden or
declined by the user, the server 300 may opt for a different
suggestion and/or not suggest that the windows be opened.

The server 300 may be configured to determine which one
or more mood interventions may have the greatest effect on
the user such that those mood interventions should be
suggested to the vehicle driver. In some examples, the mood
intervention may be any intervention that may affect the
vehicle driver's mood. For example, the mood intervention
may include, but is not limited to, a particular music genre
or audio setting, stretching exercises, usage of automated
driver capabilities, and/or a change of vehicle settings such
as vehicle seat position, window position, temperature set-
tings, or vehicle lighting. Additionally, the server may
determine which mood intervention to be implemented
based on one or more of vehicle location, vehicle event data,
current driver mood information, contextual information,
and/or the driver mood profile. For example, the server 300
may determine that a change in window settings should be
implemented based on information gathered that shows the
weather is an unusually warm day and previous mood
interventions involving the change in window settings was
previously successful in improving the vehicle driver's
mood. In other examples, the server 300 may determine that
a change in audio settings such as turning on the radio to a
particular station should be implemented based on informa-
tion gathered showing the vehicle driver is on their way
home from work on a Friday afternoon and other vehicle
drivers along the route show improved mood with similar
radio settings.

In some examples, the server 300 is configured to display
a suggestion to increase the mood of the driver if the server
300 determines that the current driver mood is below the
dynamic threshold such that it is determined that the mood
intervention should be activated. In some examples, the
server 300 may notify the vehicle driver of the mood
improvement by displaying the mood intervention through
audio, visual, or other prompts. Additionally, the server 300
may be configured to automatically implement a mood
intervention if the server has determined that the mood intervention should be activated. In some examples, the
mood intervention may be activated automatically if the
server 300 determines that the mood intervention should be
activated. However, in other examples, the driver may be
required to consent to each of the suggested mood interven-
tions individually prior to the server 300 activating the mood
intervention. For example, if the server 300 determines that
a mood intervention should be implemented, such as chang-
ing the position of a window, the server 300 may display the
suggested mood intervention (i.e., the changed position of
the window) on the dashboard 16 along with a prompt
asking the vehicle driver to agree to this intervention. The
vehicle driver may then verbally agree or interact with the
dashboard to agree to move the position of the windows.
Once the vehicle driver agrees to the window position
change, the server 300 then moves the window to the
suggested position.

As described above, the server 300 may also be config-
ured to create and update the driver mood profile. The driver
mood profile may include current and previous vehicle
driver mood scores, vehicle data 202 including current and
previous vehicle settings, and information related to previ-
ous mood interventions and their effect on the vehicle
driver's mood. It is also contemplated that every time the
mood improvement system 100 is active, the driver mood
profile is continuously updated to continually improve mood
intervention suggestions made by the server 300. For
example, once the server 300 implements the mood inter-
vention suggestion, the server 300 may then be configured
to determine an updated vehicle driver mood. The updated
vehicle driver mood may be determined once a predeter-
mined amount of time has passed, to give time for the mood
intervention to affect the mood of the vehicle driver. The
updated vehicle driver mood, along with the mood inter-
ventions taken, may be uploaded to the driver mood profile
to improve future mood intervention suggestions.

Referring to FIG. 3, an example flow diagram of opera-
tions of the mood improvement system 100 is provided. In
an initial step, the vehicle 10 begins driving at step 500.
Next, at step 502, the server 300 determines whether the
driver has opted into audio and mood monitoring. If the
driver has not opted in, an option to opt in may be displayed
at step 504. However, if the driver has opted in, the server
300 scores the current mood of the driver at 506 using an
algorithm that compares input versus output. More specifi-
cally, the mood evaluation algorithm uses inputs including
data from the vehicle sensors 12 and the vehicle cameras 14
at 600, pre-set preferences at 602, origin and destination
information at 604, traffic conditions at 606, weather con-
ditions at 608, audio at 610, and/or vehicle dynamics at 612
to score the current mood of the vehicle driver using the
algorithm at step 614. Once the driver's mood is scored at
step 506, the server 300 determines if the threshold for
intervention has been exceeded at step 508. If the threshold
for intervention has not been exceeded, the mood is re-
evaluated until the threshold is exceeded. If, however, the
threshold for intervention has been exceeded, the server 300
may suggest a mood intervention at step 510. Some mood
intervention suggestions may include music, stretching exer-
cises, using features such as cruise control or other autono-
mous driving features, seat adjustments, verbal suggestions
or the like.

The mood intervention suggestions, along with the cur-
rent mood score, are updated in the driver mood profile on
the server 300 at step 512. Additionally, the vehicle data 202
from other vehicles 10 in the vicinity may be crowdsourced
and calculated into the determination of the mood intervention suggestion at step 514. Once the action type is decided, the action is displayed or otherwise communicated to the driver at 516. The server 300 may also be configured to determine if the driver overrides the changed vehicle settings, such as music settings, within a given time period at step 517. Once the mood intervention has been activated at step 516, time is given for the mood intervention to affect the driver's mood at step 518. Once the predetermined time has passed, the mood is re-scored by the mood scoring algorithm at step 520. Once the mood is re-scored, the server 300 determines whether the threshold for intervention is still exceed at step 522. If the threshold is still exceeded, another suggestion may be displayed or taken by the server 300 at step 524. If the threshold has not been exceeded, an aggregation of the suggestion type and mood score is gathered at step 526 and sent to update the driver mood profile at step 528.

Referring again to FIGS. 1-3, the mood improvement system 100 includes the vehicle processor 200 storing vehicle data 202 including vehicle location 204, vehicle event data 206, and current driver mood information 208. The vehicle processor 200 may communicate with the server 300 to determine whether the mood intervention should be activated and additionally may activate the mood intervention. Thus, the mood improvement system 100 may advantageously assist in monitoring and improving the mood of a driver and also take the necessary steps to continually update the driver mood profile to continually provide feedback regarding successful interventions to improve future suggestions.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A mood improvement system for a vehicle, the mood improvement system comprising:
a vehicle processor for storing vehicle data including vehicle location, vehicle event data, and current driver mood information; and
a server communicatively coupled to the vehicle processor and configured to determine whether a mood intervention should be activated for a driver of the vehicle, the determination of whether a mood intervention should be activated is based on:
a comparison of a current driver mood score for the driver to a dynamic threshold;
a driver mood profile for the driver including the current driver mood information; and
contextual vehicle information including the vehicle event data and the vehicle location; and
real-time crowdsourced data including current driver mood information from nearby vehicles for drivers of the nearby vehicles having a mood score higher than the current driver mood score,

wherein the server is configured to update the dynamic threshold based on an aggregation of previous successful mood interventions.

2. The mood improvement system of claim 1, wherein the current driver mood information is based on a user input.

3. The mood improvement system of claim 1, wherein the vehicle location includes one or more of route data, traffic conditions, or weather conditions.

4. The mood improvement system of claim 1, wherein the vehicle event data includes one or more of window position, seat position, vehicle temperature, vehicle lighting, or automated driver assistance status.

5. The mood improvement system of claim 1, wherein the server is also configured to implement the mood intervention if it is determined that the mood intervention should be activated.

6. A vehicle incorporating the mood improvement system of claim 1.

7. A mood improvement system for a vehicle, the mood improvement system comprising:
a vehicle processor for storing vehicle data including vehicle location, vehicle event data, and current driver mood information; and
a server communicatively coupled to the vehicle processor and configured to determine whether a mood intervention should be activated for a driver of the vehicle, the determination of whether a mood intervention should be activated is based on:
a comparison of a current driver mood score for the driver to a dynamic threshold;
a driver mood profile for the driver including the current driver mood information; and
real-time crowdsourced data including current driver mood information from nearby vehicles for drivers of the nearby vehicles having a mood score higher than the current driver mood score,
wherein the server is configured to update the dynamic threshold based on an aggregation of previous successful mood interventions.

8. The mood improvement system of claim 7, wherein the current driver mood information is based on a user input.

9. The mood improvement system of claim 7, wherein the current driver mood information is based on data from vehicle cameras or vehicle sensors.

10. The mood improvement system of claim 7, wherein the server is configured to implement the mood intervention if it is determined that the mood intervention should be activated.

11. A vehicle incorporating the mood improvement system of claim 7.

12. A mood improvement system for a vehicle, the mood improvement system comprising:
a vehicle processor storing data including vehicle location, vehicle event data, and current driver mood information; and a server communicatively coupled to the vehicle processor and configured to: determine a current driver mood based on the current driver mood information; determine a dynamic threshold based on one or more of:
contextual vehicle information including the vehicle event data and the vehicle location; real-time crowdsourced data including one or more of current driver mood information from nearby vehicles for drivers of the nearby vehicles; real-time crowdsourced vehicle settings including one or more of vehicle seat settings, vehicle audio settings, vehicle window positions, or usages of advanced driver assistance systems from the nearby vehicles; and an aggregation of previous successful mood interventions; and display suggested vehicle improvements when the current driver mood is below the dynamic threshold, wherein the server is configured to update the dynamic threshold based on an aggregation of previous successful mood interventions.

13. The mood improvement system of claim 12, wherein the step of determining a current driver mood includes prompting a current vehicle driver to input current driver mood.

14. The mood improvement system of claim 12, wherein the step of determining a current driver mood includes evaluating a current vehicle driver using vehicle cameras and vehicle sensors.

15. The mood improvement system of claim 12, wherein the server is also configured to implement the suggested vehicle improvements.

16. The mood improvement system of claim 15, wherein the server is also configured to determine an updated current driver mood once vehicle improvements have been implemented.

17. A vehicle incorporating the mood improvement system of claim 12.

* * * * *